(12) United States Patent
Strother et al.

(10) Patent No.: US 10,663,103 B2
(45) Date of Patent: May 26, 2020

(54) PIPE REPAIR SYSTEM

(71) Applicants: Philip Strother, Paradis, LA (US); Derrick Prentice, Houma, LA (US)

(72) Inventors: Philip Strother, Paradis, LA (US); Derrick Prentice, Houma, LA (US)

(*) Notice: Subject to any disclaimer, the term of this patent is extended or adjusted under 35 U.S.C. 154(b) by 34 days.

(21) Appl. No.: 15/927,514

(22) Filed: Mar. 21, 2018

(65) Prior Publication Data
US 2018/0274710 A1    Sep. 27, 2018

Related U.S. Application Data

(60) Provisional application No. 62/474,683, filed on Mar. 22, 2017.

(51) Int. Cl.
| *F16L 55/168* | (2006.01) |
| *F16L 55/172* | (2006.01) |
| *F16L 55/17*  | (2006.01) |
| *F16L 55/18*  | (2006.01) |

(52) U.S. Cl.
CPC .......... *F16L 55/1683* (2013.01); *F16L 55/17* (2013.01); *F16L 55/172* (2013.01); *F16L 55/1705* (2013.01); *F16L 55/18* (2013.01)

(58) Field of Classification Search
CPC ... F16L 55/1683; F16L 55/17; F16L 55/1705; F16L 55/172; F16L 55/18
USPC .......................................................... 138/99
See application file for complete search history.

(56) References Cited

U.S. PATENT DOCUMENTS

| 2,127,456 A   | 8/1938 | Adams  |             |
|---------------|--------|--------|-------------|
| 2,690,193 A * | 9/1954 | Smith  | F16L 55/172 |
|               |        |        | 138/99      |
| 2,800,867 A   | 7/1957 | Smith  |             |
| 3,341,232 A * | 9/1967 | Deakins| F16L 21/005 |
|               |        |        | 285/373     |

(Continued)

FOREIGN PATENT DOCUMENTS

RU        2133401        7/1999

OTHER PUBLICATIONS

Ratchet Cage Clamps. Aug. 7, 2016. http://www.mathey.com/Pages/clamp-cage-racthet.htm.

(Continued)

*Primary Examiner* — Craig M Schneider
*Assistant Examiner* — David R Deal
(74) *Attorney, Agent, or Firm* — Roy, Kiesel, Ford, Doody & North, APLC; Brett A. North

(57) ABSTRACT

The present invention provides an adjustable clamp apparatus having curved arms which pivot/articulate relative to each other. The distance between pivot points can be adjusted via specially configured couplers having nuts and threaded rods. The curved arms can be locked together with a rod placed in a slot, and then squeezed by rotation of threaded rod. In the interior of the curved arms there can be a plurality of projections or contact points. A strap can be connected to a selected adjustable clamp (e.g., by a pair of padeyes) and used to raise and lower the clamp. When being lowered onto a pipe to be repaired, the curved arms can be open wide and when their upper portions make contact with the pipe to be repaired, this contact will tend to cause arms to close around the pipe relative to each other. Once clamped against the pipe with the clamps, the repair members can be welded together.

14 Claims, 13 Drawing Sheets

(56) References Cited

U.S. PATENT DOCUMENTS

| | | | | |
|---|---|---|---|---|
| 3,565,468 A * | 2/1971 | Garrett | F16L 21/005 | |
| | | | 285/373 | |
| 3,933,292 A | 1/1976 | Martin | | |
| 4,365,393 A * | 12/1982 | Hauffe | F16L 21/005 | |
| | | | 138/99 | |
| 4,381,020 A * | 4/1983 | Daghe | F16L 21/005 | |
| | | | 138/99 | |
| 4,473,246 A * | 9/1984 | McDowell | F16L 21/065 | |
| | | | 285/330 | |
| 4,630,647 A * | 12/1986 | Thomson | F16L 55/1725 | |
| | | | 138/99 | |
| 4,666,138 A | 5/1987 | Dearman | | |
| 5,358,286 A * | 10/1994 | Eaton | F16L 47/30 | |
| | | | 285/197 | |
| 6,830,268 B2 * | 12/2004 | Krausz | F16L 55/172 | |
| | | | 138/99 | |
| 7,232,160 B2 * | 6/2007 | Krausz | F16L 55/172 | |
| | | | 285/15 | |
| 8,430,432 B2 * | 4/2013 | Webb | F16L 17/04 | |
| | | | 285/340 | |
| 8,465,060 B2 * | 6/2013 | Peet | F16L 23/08 | |
| | | | 285/407 | |
| 8,714,433 B1 | 5/2014 | Snead et al. | | |
| 2007/0296213 A1 * | 12/2007 | Jones | F16L 25/12 | |
| | | | 285/421 | |
| 2016/0334045 A1 | 11/2016 | Smyth et al. | | |

OTHER PUBLICATIONS

Plidco. The Pipe Line Development Company Brochure. 2016. www.plidco.com.

Carl E. Jaske, Brian O. Hart, and Willaim A. Bruce; Pipline Repair Manual Aug. 8, 2006.

\* cited by examiner

PIPE REPAIR SYSTEM

CROSS-REFERENCE TO RELATED APPLICATIONS

This is a non-provisional of U.S. provisional patent application Ser. No. 62/474,683, filed Feb. 22, 2017, which application is incorporated herein by reference and prior of/to which application is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the repair of a section of pipe with component parts that cover a damaged portion of the pipe and wherein specially configured clamps compress repair members against the pipe outer surface.

2. General Background of the Invention

Pipelines are elongated structures comprised of joints of pipe welded or (otherwise connected) together end to end. Pipelines are often buried. Pipelines can be installed underwater. These hostile environments can produce damage that must be repaired.

The following possibly relevant U.S. patents are incorporated herein by reference:

BRIEF SUMMARY OF THE INVENTION

The present invention provides an adjustable clamp apparatus having curved clamping sections, jaws or arms which pivot/articulate relative to each other. The distance between pivot points can be adjusted via couplers having threaded rods. The curved arms can be locked together with a rod placed in a slot, and then squeezed by rotation of threaded rod.

In the interior of the curved clamping sections, jaws or arms can be a plurality of contact points. A sling or strap can be connected to a selected adjustable clamp (e.g., with padeyes) and used to raise and lower the clamp apparatus. When being lowered onto a pipe to be repaired (e.g., by welding on a pair of repair sleeves), the curved arms can be opened wide. When their upper portions make contact with the pipe to be repaired, this contact will tend to cause the clamping sections, jaws, or arms to close around the pipe as they move relative to each other.

In the present invention this provides an improved method and apparatus for repairing a pipe section that is damaged or that has a damaged joint or section.

The method includes the providing of one or more (e.g., upper and lower) repair members, each repair member having an inner curved surface that conforms generally to at least part of the outer surface of the pipe section to be repaired.

One or more clamps is provided, each clamp including first and second clamping portions, curved arms or jaws. In one embodiment, the jaws can be pairs of curved members connected together. Couplers each connect to both jaws/clamping members or pairs of curved sections, the couplers being positioned at spaced apart positions.

Each coupler includes a bolt or shaft having an externally threaded portion and first and second nuts, one of which is an internally threaded nut that forms a threaded connection with the external threads of the externally threaded member,

| PAT. NO. | TITLE | ISSUE DATE |
| --- | --- | --- |
| 9,079,271 | STRUCTURAL CONNECTION ALIGNING DEVICE | Jul. 14, 2015 |
| 8,782,863 | PRESS TOOL FOR CONNECTING IN PARTICULAR TUBULAR WORKPIECES | Jul. 22, 2014 |
| 8,578,578 | PIPE ADJUSTMENT TOOL | Nov. 12, 2013 |
| 8,397,975 | TACK WELDING CLAMPS FOR AXIALLY ALIGNING AND HOLDING CURVED OR STRAIGHT TUBULAR SECTIONS | Mar. 19, 2013 |
| 7,967,343 | ADAPTER FOR CLAMPS, PARTICULARLY FOR WELDING PLASTIC PIPES | Jun. 28, 2011 |
| 6,840,433 | METHOD AND DEVICE FOR WELDING PIPES | Jan. 11, 2005 |
| 6,651,967 | ALIGNMENT CLAMP | Nov. 25, 2003 |
| 6,325,277 | APPARATUS AND METHOD FOR ALIGNING TUBING SEGMENTS | Dec. 4, 2001 |
| 5,865,430 | ALIGNMENT CLAMP AND METHOD FOR ITS USE | Feb. 2, 1999 |
| 5,666,711 | PRESS TOOL | Sep. 16, 1997 |
| 5,165,160 | APPARATUS AND METHOD FOR AXIALLY ALIGNING STRAIGHT OR CURVED CONDUITS | Nov. 24, 1992 |
| 5,052,608 | PIPE FITTING TOOL | Oct. 1, 1991 |
| 4,750,662 | PIPE WELDING ALIGNMENT TOOL | Jun. 14, 1988 |
| 4,586,647 | PIPE CLAMPS | May 6, 1986 |
| 4,467,955 | AXLE STUBBING JIG AND METHOD OF USE | Aug. 28, 1984 |
| 4,565,003 | PIPE ALIGNMENT APPARATUS | Jan. 21, 1986 |
| 3,971,579 | WELD CLAMP SEAL | Jul. 27, 1976 |
| 3,920,232 | APPARATUS FOR ALIGNING PIPE ENDS | Nov. 18, 1975 |
| 2,846,968 | MECHANICAL PIPE LINE CLAMP | Aug. 12, 1958 |
| 2007/0256288 | METHOD AND DEVICE FOR WELDING PIPES | Nov. 8, 2007 | bolt or shaft. The other bolt has an unthreaded opening that is occupied by an unthreaded portion of the bolt or shaft.

The clamp or clamps compress the repair members against the pipe section.

One or both of the externally threaded members is rotated to change the distance between the nuts.

These method steps can be repeated at a second position that is spaced from the first position so that multiple clamps optionally secure the repair member(s) to the pipe.

In one embodiment, the curved members of each pair are spaced apart.

In one embodiment, the curved members of each pair are generally parallel.

In one embodiment, the curved members of each pair have spaced part ends, at least one said end having a slot and the method includes attaching a nut to two of the curved members at the slots.

In one embodiment, the curved members are spaced apart with one or more transverse plates.

In one embodiment, the nut is pivotally attached to a pair of the curved members.

In one embodiment, multiple of the nuts are pivotally attached to the curved members.

In one embodiment, one of the nuts is pivotally attached to the curved members and removably attachable to the curved members at a slot.

In one embodiment, the clamps have concave surfaces with one or more projections.

In various embodiments the clamps can have a width or depth of less than 18 inches (45.72 cm). In various embodiments the clamps can have a width or depth of less than 18, 16, 14, 10, 8, 6, 4, and 2 inches (45.72, 40.64, 35.56, 25.4, 20.32, 15.24, 10.16, and 5.08 cm). In various embodiments the clamps can have a width or depth falling within the range of any two of the above referenced widths or depths.

In various embodiments the clamp apparatus can be positioned over repair members or sleeves and tightened for purposes of enabling welding of one repair member or sleeve to the other repair member or sleeve. Once placed in position over the repair member or members, the clamp apparatus is closed by clamping at least one of the couplers to gaps or channels or slots so that each of the couplers can then be independently adjusted or tightened. Once closed, the clamp can be rotated over and/or slidingly moved relative to the repair member or members placing contact points on the widest gap between the sleeve or repair member and pipe section to be repaired. A closed clamp is then tightened over the repair member or members or sleeves squeezing the repair member or members against the pipe and eliminating any gap between the repair member or members and the pipe in preparation for welding.

In various embodiments, the contact point positions of a first clamping apparatus can be reconfigured to customize the location and/or direction of force on the warped sleeve while simultaneously a second clamping apparatus can hold the warped sleeve in place. To achieve this goal, one end of the first clamping apparatus can be loosened to provide slack which in turn tightened up by tightening the reverse side coupler or screw. This dual adjustment of the couplers on the first clamping apparatus allows for immediate and accurate corrective bending of ever different sleeve variance. The closed first clamping apparatus can be loosened over the repair members or sleeves at one end in order to provide space to be closed by tightening the opposite side screw or coupler.

A second clamp apparatus can be positioned over the repair member or members and lowered into place so that there are two clamps at spaced apart positions. The use of two or more clamps allows for the unique positioning of one clamp while the second clamp is in place holding the repair member, sleeve or split tee in position. The use of two or more spatially adjustable couplers or hinges enables a user to customize contact point positions thus changing the direction of force on any warped position of the sleeve or repair member.

Upon placement of the repair member or members over the pipe, there is typically some gap in between the repair member or members and the outer surface of the pipe. The clamp can be rotated over the sleeves or repair members placing contact points of the clamp at the widest gap between the repair member or members and the pipe. Once in this position, the clamp is tightened eliminating the gap between the repair member(s) or sleeve(s) and the pipe in preparation for welding.

In various embodiments, while a second clamping apparatus can hold one repair member or sleeve in place, a first clamping apparatus can be loosened and rotated at least 5 degrees relative to one repair member or sleeve about a longitudinal axis, tightened, and then repair welding performed on the one repair member or sleeve. In various embodiments, while a second clamping apparatus can hold one repair member or sleeve in place, the first clamping apparatus can be loosened and rotated at least 1, 2, 3, 4, 5, 10, 15, 20, 25, 30, 35, 40, 45, 50, 55, 60, 75, 90, 105, 120, 150, 180, 210, 240, 270, 300, and/or 360 degrees relative to one repair member or sleeve about a longitudinal axis, tightened, and then repair welding performed on the one repair member or sleeve. In various embodiments, while a second clamping apparatus can hold one repair member or sleeve in place, the first clamping apparatus can be loosened and rotated between a range falling within any two of the above referenced angular measurements about a longitudinal axis relative to one repair member or sleeve, tightened, and then repair welding performed on the one repair member or sleeve. In various embodiments, while a second clamping apparatus can hold one repair member or sleeve in place, the first clamping apparatus can be loosened and rotated between a range falling within any range between 1 and 360 degrees relative to one repair member or sleeve about a longitudinal axis, tightened, and then repair welding performed on the one repair member or sleeve.

In various embodiments, while a second clamping apparatus can hold one repair member or sleeve in place, a first clamping apparatus can be loosened and slid relative to the one repair member or sleeve so as to change the relative distance between the first and second clamps by at least 5 percent, tightened on the one repair member or sleeve, and then repair welding performed on the one repair member or sleeve. In various embodiments, while a second clamping apparatus can hold one repair member or sleeve in place, a first clamping apparatus can be loosened and slid relative to the one repair member or sleeve so as to change the relative distance between the first and second clamps by at least 1, 2, 3, 4, 5, 10, 15, 20, 25, 30, 35, 40, 45, 50, 55, 60, 65, and/or 75 percent, tightened on the one repair member or sleeve, and then repair welding performed on the one repair member or sleeve. In various embodiments, while a second clamping apparatus can hold one repair member or sleeve in place, a first clamping apparatus can be loosened and slid relative to the one repair member or sleeve so as to change the relative distance between the first and second clamps by an amount falling within any two of the above referenced percentage changes in distance, tightened on the one repair member or sleeve, and then repair welding performed on the one repair member or sleeve.

The method and apparatus avoids the use of a chain to hold/squeeze the repair plates, which prior art method can be dangerous.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 14:
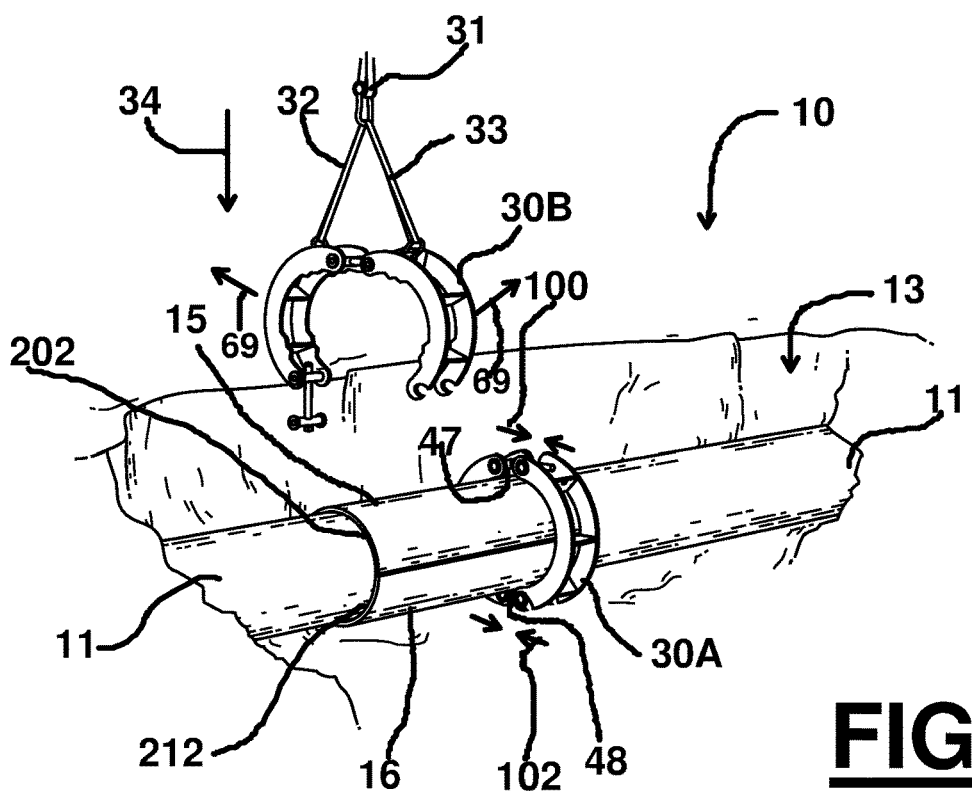
FIG. 14 is a perspective view of a second clamp apparatus being lowered onto the damaged pipe of FIG. 9 while the first clamp apparatus is locked onto and supporting both the first and second repair members
Figure 15:
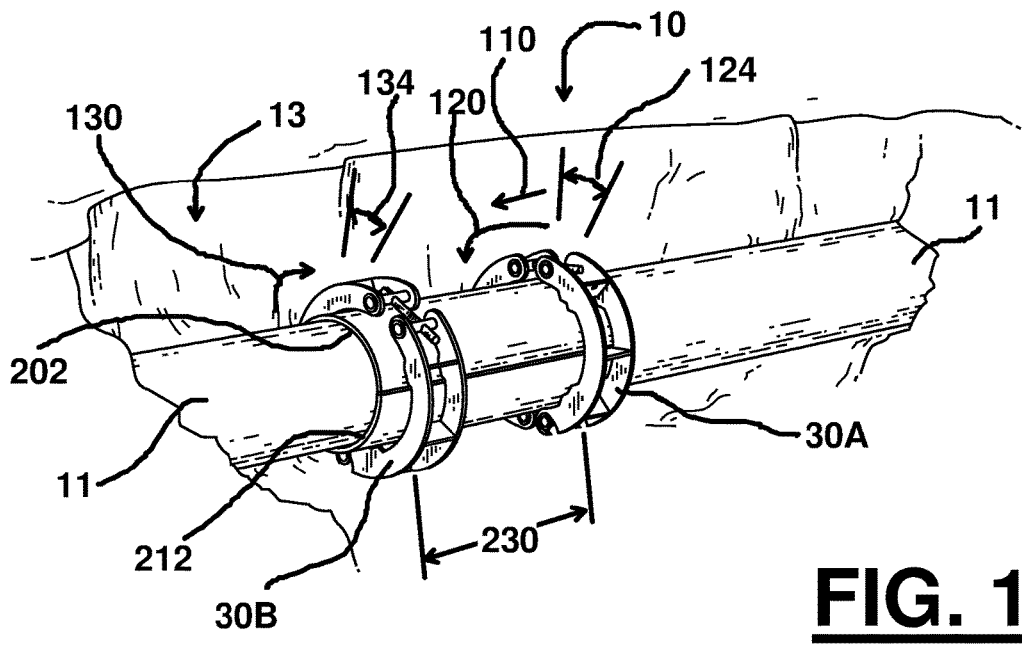
FIG. 15 is a perspective view of the first and second clamping apparatuses now located on the damaged pipe of FIG. 9, and schematically showing the first and second clamp apparatuses having the ability to see relative movement relative to each other along with relative movement with respective to both the first and second repair members, and that this relative movement can be rotational and/or translational.
Figure 16:
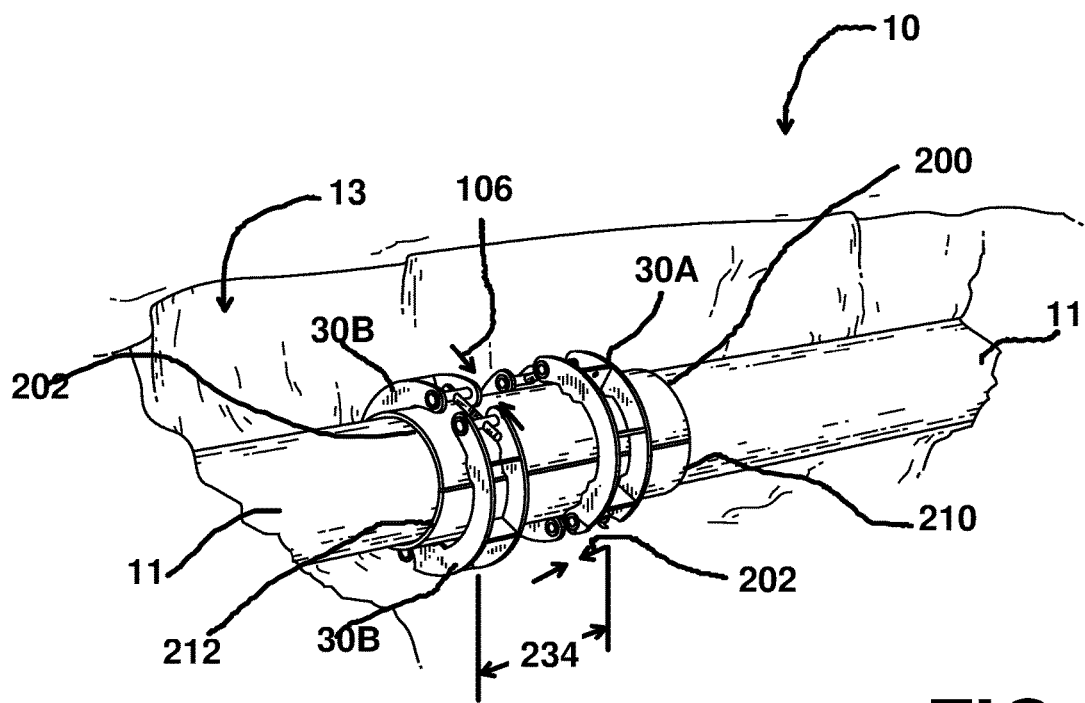
FIG. 16 is a perspective view of the first and second clamping apparatuses of FIG. 15 and schematically indicating that particular couplers can be expanded to allow the relative rotational and/or translational movement and then retracted to again clamp onto the first and second repair members to then allow welding of the first and/or second repair members.

FIGS. 1-16 show the preferred embodiment of the apparatus of the present invention designated generally by the numeral 10 in FIGS. 15-16. Pipe repair apparatus 10 is used to repair a pipe section 11 having a damaged portion 12 (see FIGS. 9-10) which could be, for example, a crack, hole, corroded portion or cut. In the drawings, pipe section 11 could occupy a pipe trench 13 wherein the damaged pipe section 11 could be a buried pipeline that is partially unearthed to reveal and expose the damaged portion 12.

Pipe section 11 can have a generally cylindrically shaped outer surface 14. The pipe section 11 could have an outer surface 14 that has a different shape or traverse cross section other than cylindrical (e.g., oval, egg shape, etc).

Figure 10:
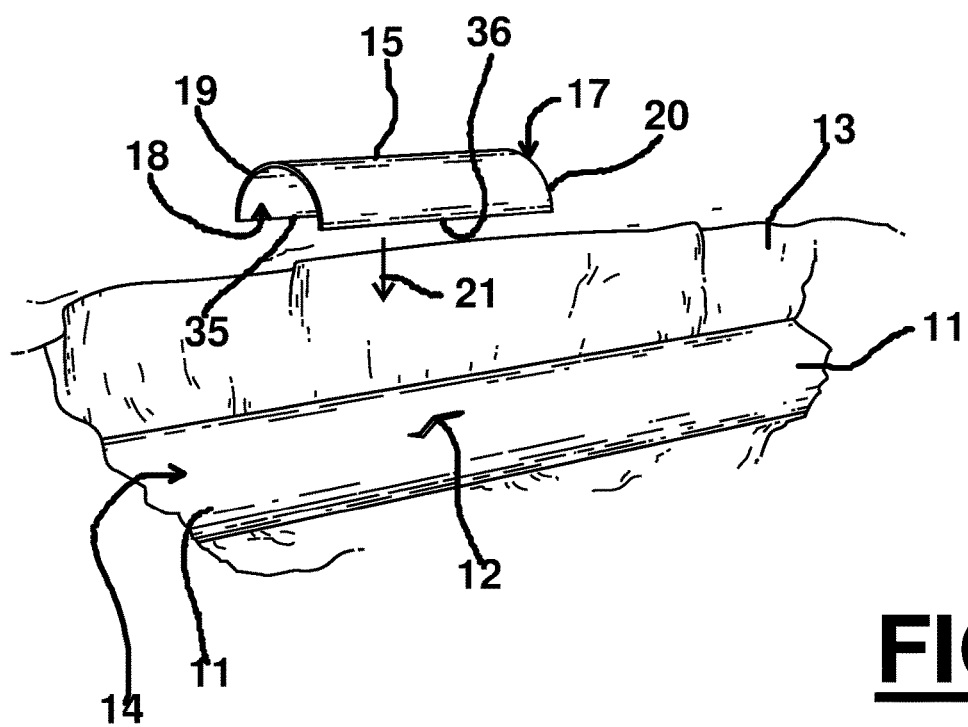
FIG. 10 is a perspective view showing a first repair member being lowered onto the damaged pipe of FIG. 9.
Figure 11:
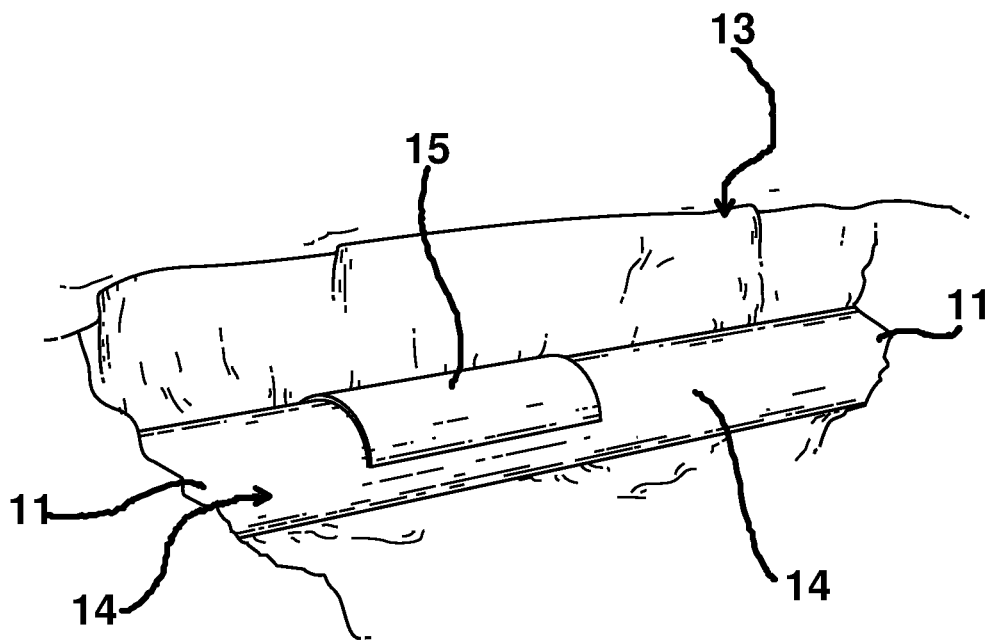
FIG. 11 is a perspective view showing a first repair member sitting on the damaged pipe of FIG. 9.
Figure 12:
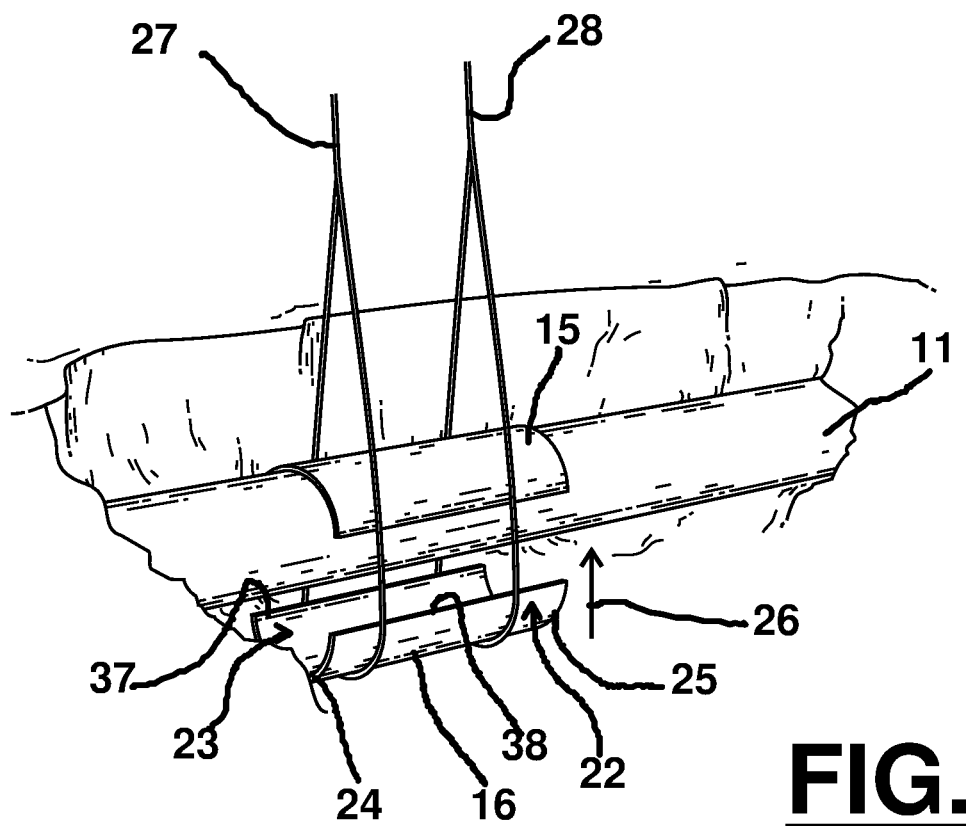
FIG. 12 is a perspective view showing a second repair member being raised up to and the first repair member sitting on the damaged pipe of FIG. 9.

In FIG. 10, a first repair member 15 is shown being lowered to a position on pipe section 11 as indicated by arrow 21. First repair member 15 has a convex surface 17, concave surface 18, curved edges 19, 20 and straight edges 35, 36. In FIGS. 10-12, the repair member 15 occupies a position on pipe section 11 and covering damaged portion 12. The concave surface 18 of first repair member 15 can be sized and shaped to cover the damaged portion 12. Surface 18 can be shaped to conform to the cylindrical or other outer surface 14 of pipe section 11.

Figure 13:
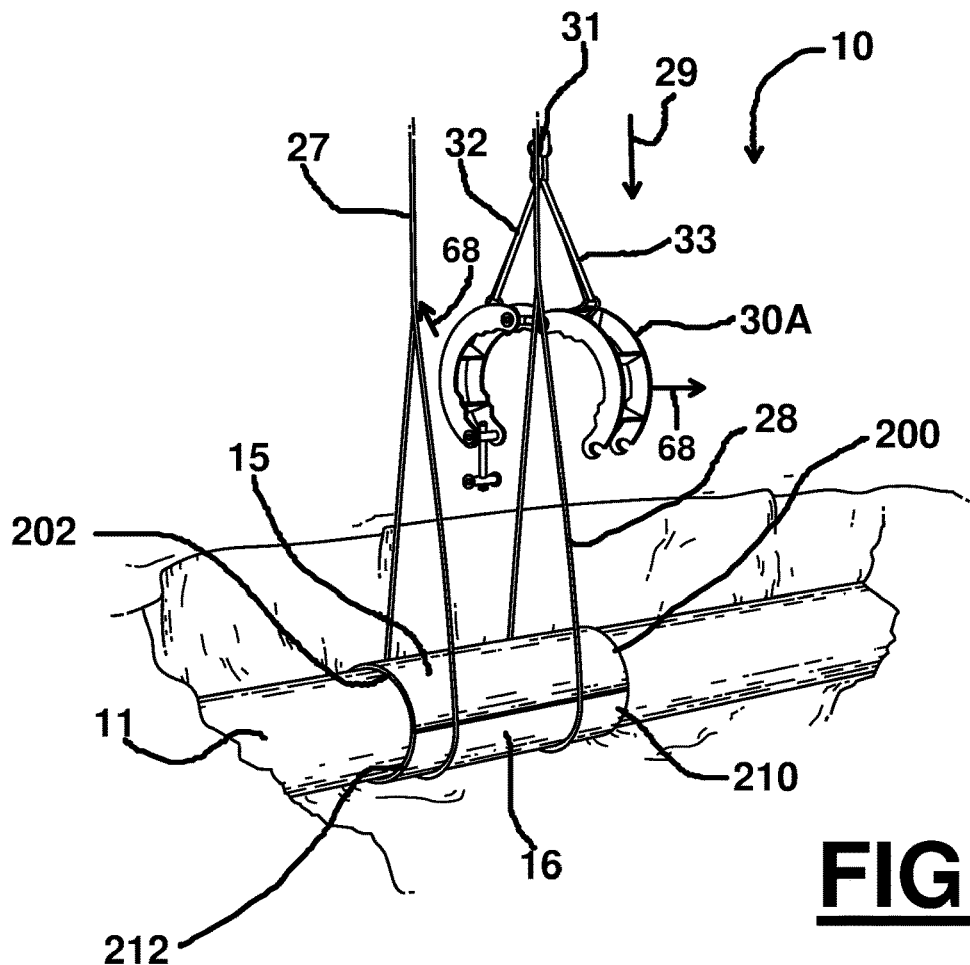
FIG. 13 is a perspective view of a first clamp apparatus being lowered onto the damaged pipe of FIG. 9 which has the first and second repair members.

In FIG. 12, a second repair member 16 is shown prior to its application to outer surface 14 of pipe section 11. In FIG. 12, first and second slings, rigging, or cables 27, 28 are shown lifting second repair member 16 upwardly as indicated by arrow 26. The second repair member 16 can be of a similar size and shape to the first repair member 15 for a pipe section with a cylindrical cross section. In that regard, the second repair member 16 can provide a convex surface 22, concave surface 23, spaced apart curved edges 24, 25 and straight edges 37, 38. In FIG. 13, the repair members 15, 16 have been pulled together so that the straight edges 35, 36 and 37, 38 of each repair member 15, 16 align and contact one another as seen in FIGS. 10, 11, 12 and 13. The straight edges can include edges 35, 36 on first repair member 15 and edges 37, 38 on second repair member 16, wherein edge 35 abuts and aligns with edge 37 and edge 36 abuts and aligns with edge 38.

In FIG. 13, a first clamp apparatus 30A is shown being lowered to the repair members 15, 16 as illustrated by arrow 29. A lifting harness/lift cable 31 (crane lift cable) can be used to lower the first clamp apparatus 30A to repair sections 15, 16. The lift cable or lifting harness 31 can provide first and second cable sections 32, 33 as seen in FIG. 13. In FIG. 14, a second clamp apparatus 30B is shown being lifted into a position next to but spaced from first clamp apparatus 30A as illustrated by arrow 34.

Figure 1:
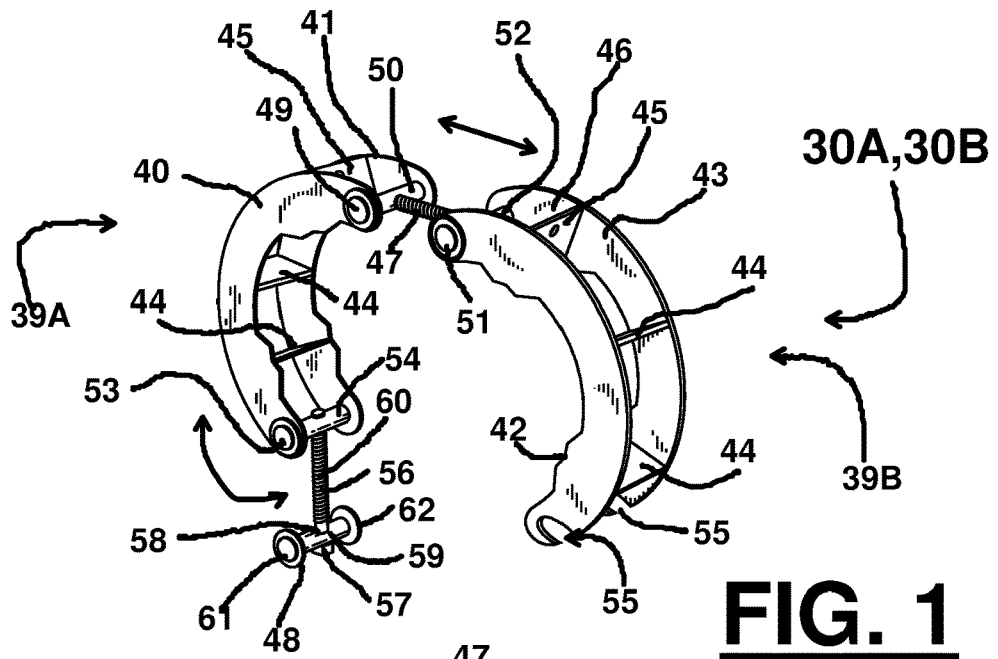
FIG. 1 is a partial perspective view of the preferred embodiment of the apparatus of the present invention shown in an enlarged open state.
Figure 2:
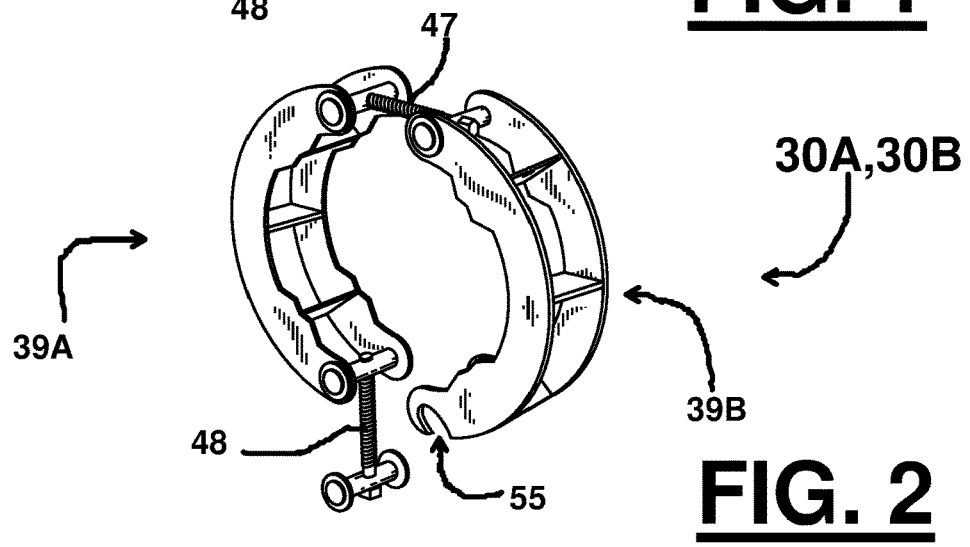
FIG. 2 is a partial perspective view of the preferred embodiment of the apparatus of the present invention shown in an open state with the upper and lower connectors in expanded states.

Each clamp apparatus 30A, 30B can be seen in more detail in FIGS. 1-8. Alternate clamp embodiments can be seen in FIGS. 17-21. Each clamp apparatus 30A, 30B includes jaws or clamping members 39A, 39B. Each jaw or clamping member 39A, 39B can be constructed (e.g., welded steel/metal) of spaced apart arc shaped members or curved members or plates 40, 41, 42, 43. Gussets/plates or spacers 44, 45 can be used to space apart each pair of arc shaped repair members 40, 41 as seen in FIG. 1. Likewise, gussets, plates or spacers 44, 45 can be used to space apart arc shaped members 42, 43.

The gussets, plates or spacers 45 each have an opening 46 that is receptive of a cable section 32, 33. A suitable fitting such as a shackle can be used to perfect a connection between plates, gussets or spacers 45 at openings 46 and cable sections 32 or 33 of a lifting harness, lift cable or strap 31.

First and second couplers 47, 48 are used to join pairs of arc shaped members together as seen in FIGS. 1-8. Each coupler 47, 48 forms a pivotal connection with the arc shaped members 40, 41 as seen in FIG. 1. The first coupler 47 forms a pivotal connection with arc shaped members 42, 43. The second coupler 48 forms a pivotal connection with the plates or arc shaped members 40, 41. The second coupler 48 forms a removable connection with slot, recess or opening 55 of plates or arc shape members 42, 43 as seen in FIGS. 1-8.

Figure 7:
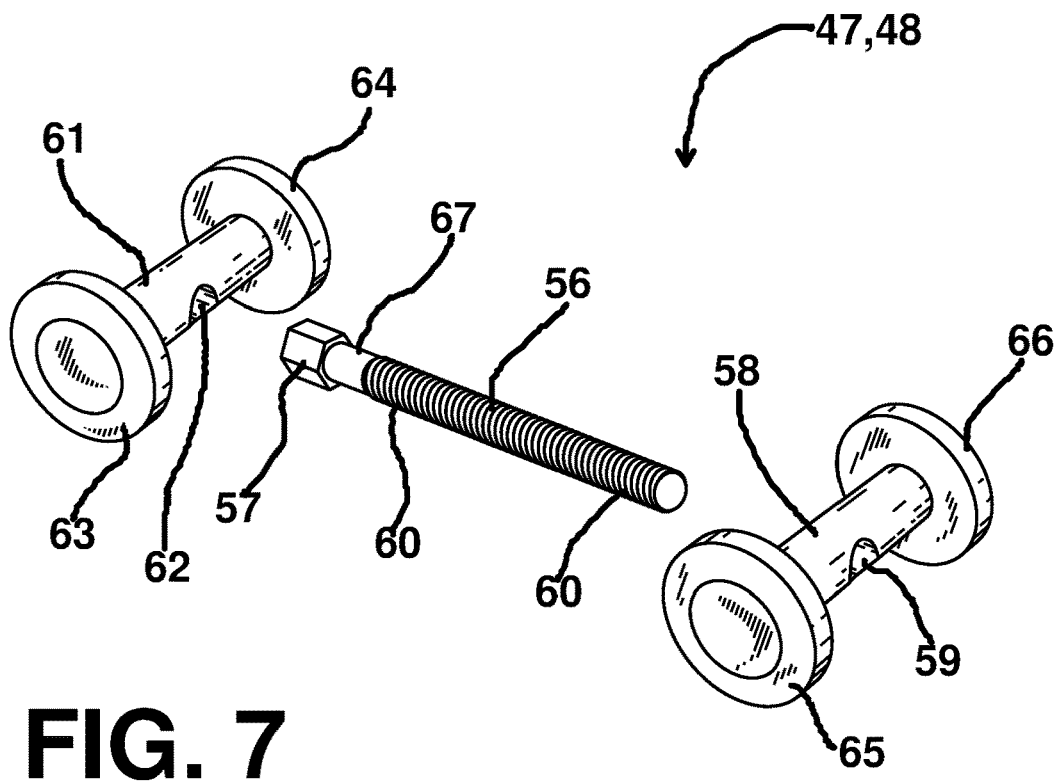
FIG. 7 is an exploded perspective view of a preferred embodiment of a connector which can be used with various embodiments.
Figure 8:
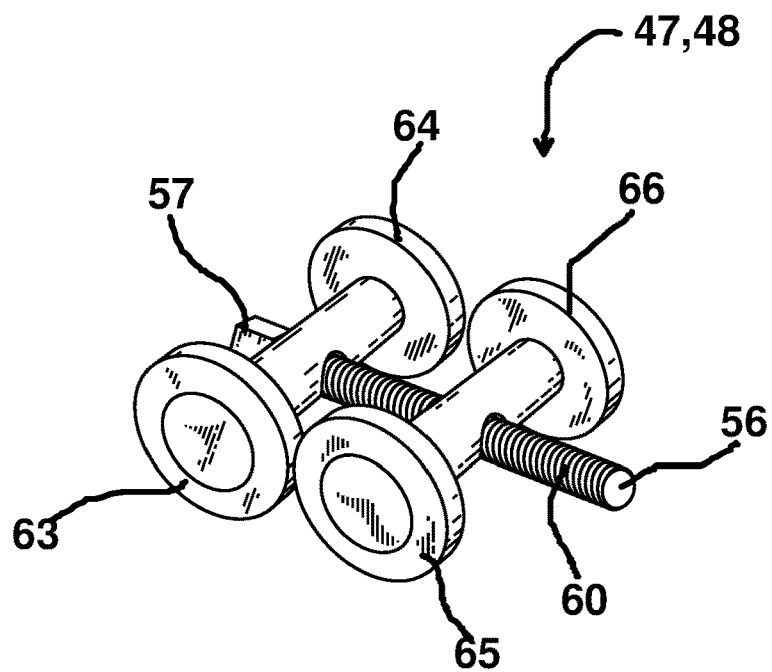
FIG. 8 is a perspective view of the connector of FIG. 7 shown in a retracted state.

FIG. 7 is an exploded perspective view of a connectors 47, 48 which can be used with various embodiments. FIG. 8 is a perspective view of connectors 47, 48 shown in a retracted state. Each connector/coupler 47, 48 includes a bolt or threaded shaft 56 having a head 57. The head 57 can be sized and shaped to form a connection with a suitable tool such as a socket wrench, allen wrench or the like. Bolt/threaded shaft 56 forms a threaded connection with nut 58 at opening 59. The threaded shaft 56 thus provides external threads 60 that engage correspondingly sized and shaped internal threads of nut 58 at opening 59. Bolt/threaded shaft 56 can be inserted through opening 62 in nut 61. Opening 62 can be unthreaded (e.g., cylindrical). Unthreaded portion 67 of bolt/shaft 56 occupies opening 62 so that head 57 abuts nut 61 next to opening 62 even when rotated (e.g., see FIGS. 3-8).

Each of the couplers 47, 48 provide a plurality of end plates or retainers. The couplers 47, 48 have end plates or retainers 63, 64 on nut 61 and retainer 65, 66 on nut 58 as seen in FIGS. 7 and 8. The retainers 63-66 prevent disassembly of either of the bolts 58, 61 from the plates or curved members 40, 41, 42, 43 during use. Thus, the present invention provides adjustable clamps 30A, 30B each including curved members or arms 40, 41, 42, 43 which pivot or articulate relative to each other as schematically indicated by arrows 68 and 69 in FIGS. 13, 14 for upwardly pivoting about pivot points or nuts 58, 61. The distance between the pivot points 58, 61 can be adjusted (schematically indicated by arrows 70 in FIGS. 3-5) via couplers 47, 48 having the threaded rod or shaft 56 that engages internally threaded opening 59 of nut 58.

Figure 3:
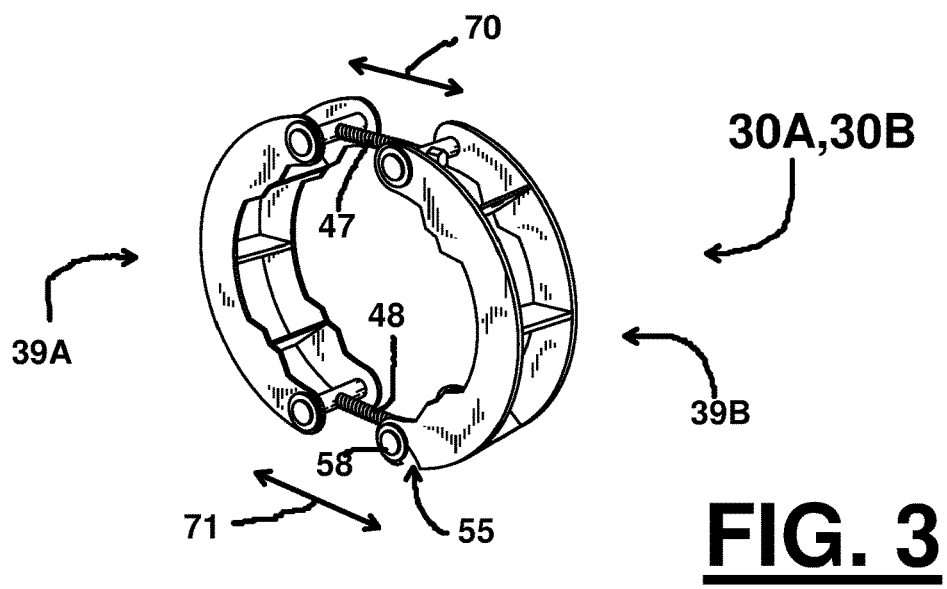
FIG. 3 is a partial perspective view of the preferred embodiment of the apparatus of the present invention shown in a closed state with the upper and lower connecters in expanded states.
Figure 4:
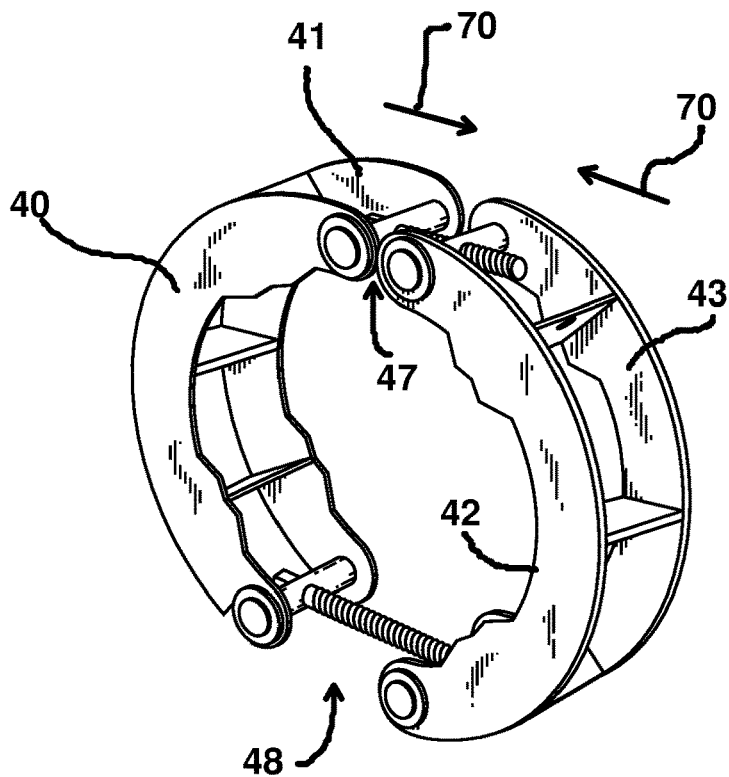
FIG. 4 is a partial perspective view of the preferred embodiment of the apparatus of the present invention shown in a closed state with the upper connecter in a retracted state and the lower connector in an expanded state.
Figure 5:
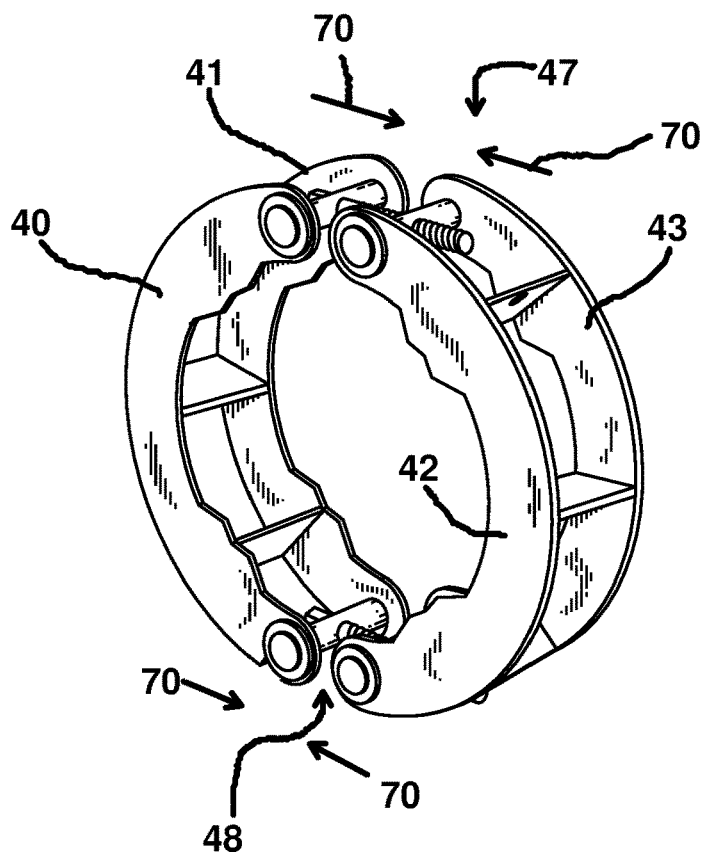
FIG. 5 is a partial perspective view of a preferred embodiment of the apparatus of the present invention shown in a closed state with the upper and lower connectors shown in retracted states.
Figure 6:
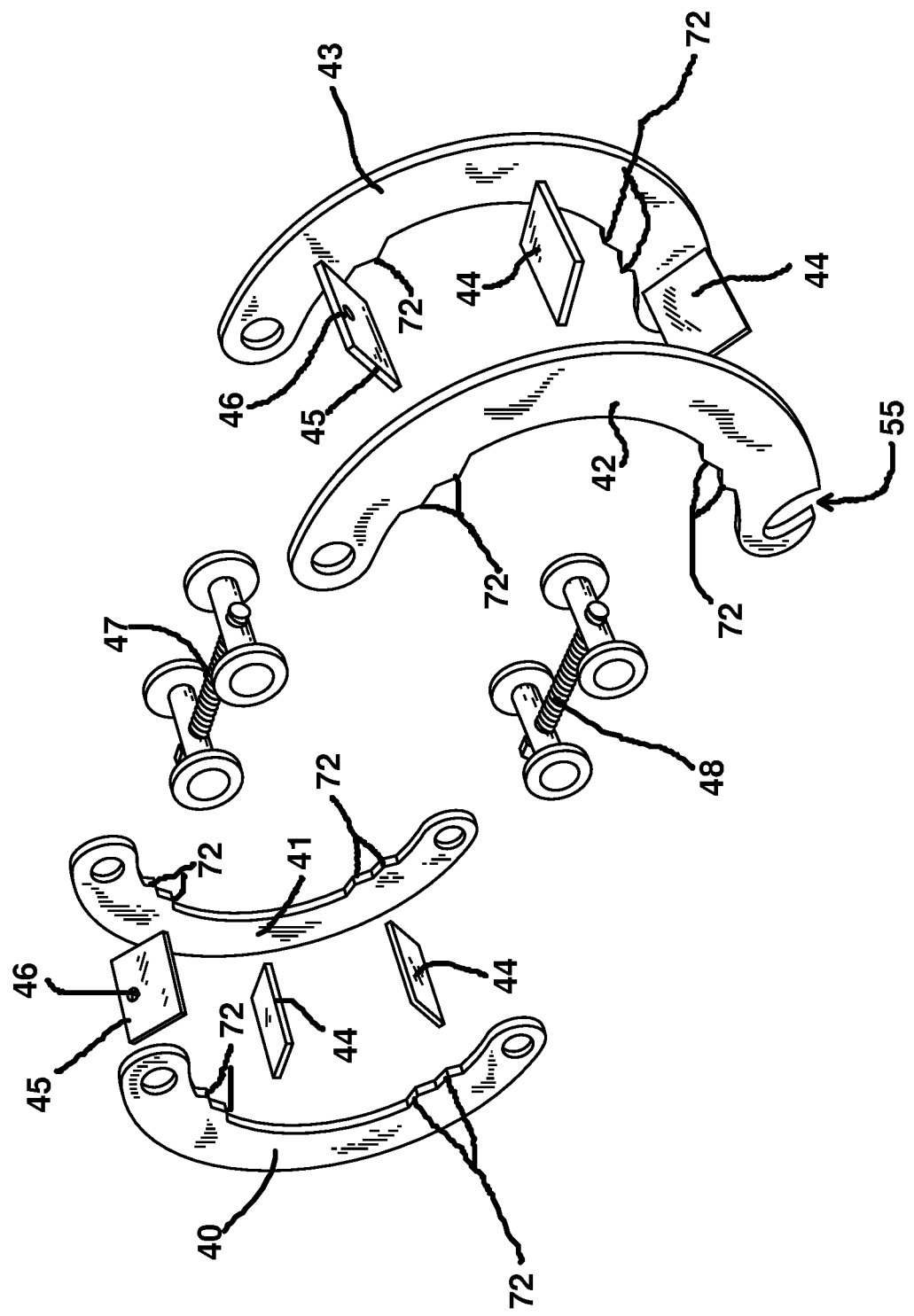
FIG. 6 is an exploded perspective view of a preferred embodiment of the apparatus of the present invention.

The curved members or arms 40, 41, 42, 43 can be locked together with a nut 58 placed in slot 55 as seen in FIG. 3 and as illustrated by arrow 71. Along the interior of each curved member or arm 40, 41, 42, 43 can be provided a plurality of contact points or projections 72 (see FIG. 6).

The repair members or sleeves 15, 16 can be welded together after application of the clamps 30A, 30B in FIGS. 10-16. When being lowered onto a pipe section 11 to be repaired, the curved arms or members 40, 41, 42, 43 can be opened wide to the position shown in FIGS. 1 and 13-14. When lowered to contact the pipe section 11 to be repaired, such contact will tend to cause the arms 40, 41, 42, 43 to close around the pipe section 11 relative to each other as seen in FIGS. 14-16.

Figure 9:
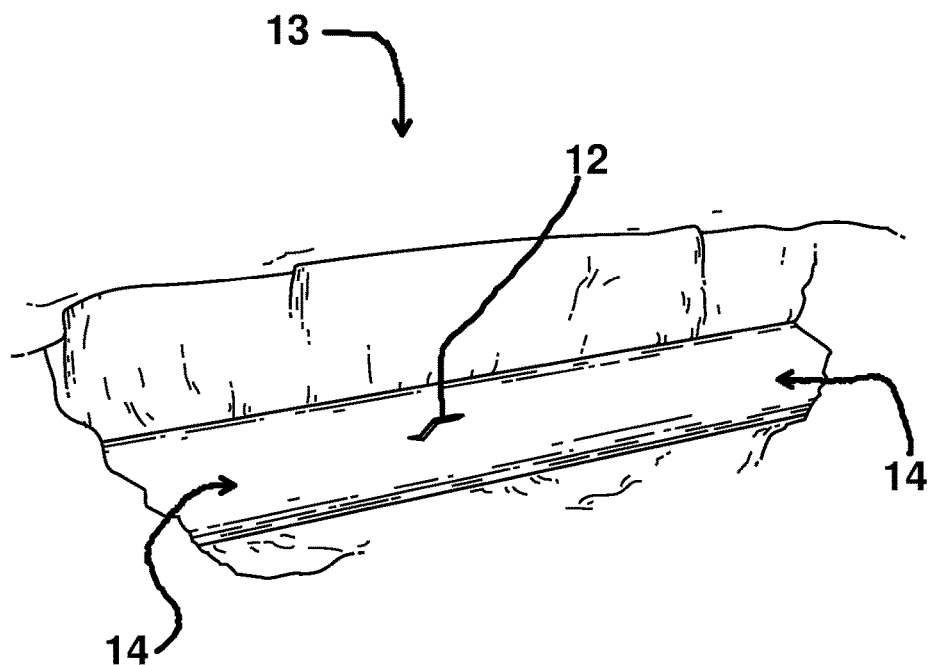
FIG. 9 is a perspective view showing a section of pipe in a pipe trench and having a damaged portion.

FIGS. 9-16 show one embodiment of a method of repairing a damaged repair method using the first 30A and second 30B clamping systems. FIG. 9 is a perspective view showing a section of pipe 11 in a pipe trench 13 and having a damaged portion 12. Damaged pipe 11 can be repaired by welding a pair of repair members 15, 16 onto the surface 14 and over the damaged portion 12.

FIG. 10 is a perspective view showing a first repair member 15 being lowered onto the damaged pipe 11 (arrow 21 schematically indicates the lowering of first report member 15 over damaged portion 12). FIG. 11 is a perspective view showing a first repair member 15 now sitting on surface 14 and over damaged portion 12 of pipe 11. FIG. 12 is a perspective view showing a second repair member 16 being raised up to pipe 11 and the first repair member 15 sitting on the damaged pipe 11. Rigging 27, 28 can be used to raise second repair member 16 up to pipe 11 (arrow 26 schematically indicates the raising of second repair member 16 to pipe 11).

Ideally, first 15 and second 16 repair members would closely conform to outer surface 14 of damage pipe 11 to allow a good repair by welding together first 15 and second 16 repair members to each other and onto damaged pipe 11. However, in many cases a close fit is not found and the fit must be forced to make a good pipe repair. In various embodiments first 30A and second 30B clamping apparatuses can be used to make a close fit between first 15 and second 16 repair members to each other and to damaged pipe 11. One embodiment will be described below.

FIG. 13 is a perspective view of a first clamp apparatus 30A being lowered onto the damaged pipe 11 which has the first 15 and second 16 repair members to be welded onto pipe 11. Preferably, first clamp apparatus 30A is being lowered onto a point between the perimeter edges of first 15 and second 16 repair members (e.g., between first 200 and second 202 edge of first repair member 15 and first 210 and second 212 edge of second repair member 16). Alternatively, first clamp apparatus 30A can be lowered onto a point where it straddles one of the perimeter edges (e.g., straddling first 200, 210 perimeter edges of first 15 and second 16 repair members or straddling second 202,212 perimeter edges of first 15 and second 16 repair members). Arrows 100 and 102 schematically indicate that first 47 and second 48 couplers are retracted/tightened to clamp first clamping apparatus 15 only first 15 and second 16 repair members. Alternatively, only second coupler 48 can be retracted/tightened.

FIG. 14 is a perspective view of a second clamp apparatus 30B being lowered onto the damaged pipe 11 while the first clamp apparatus 30A is locked onto and supporting both the first 15 and second 16 repair members. Preferably, second clamp apparatus 30B is being lowered onto a point between the perimeter edges of first 15 (i.e., edges 200,202) and second 16 (i.e., edges 210,212) repair members (e.g., between first 200 and second 202 edge of first repair member 15 and first 210 and second 212 edge of second repair member 16). Alternatively, second clamp apparatus 30B can be lowered onto a point where it straddles one of the perimeter edges (e.g., straddling first 200, 210 perimeter edges of first 15 and second 16 repair members or straddling second 202,212 perimeter edges of first 15 and second 16 repair members).

FIG. 15 is a perspective view of the first 30A and second 30B clamping apparatuses now located on the damaged pipe 11, and schematically showing the first 30A and second 30B clamp apparatuses having the ability to accomplish relative movement with respect to each other 30A,30B along with relative movement with respective to both the first 15 and second 16 repair members, and that this relative movement can be rotational and/or translational.

Relative rotational movement of first clamping apparatus 30A is schematically indicated by arrow 120 with amount of rotational movement indicated by angle 124. Relative rotational movement of second clamping apparatus 30B is schematically indicated by arrow 130 with amount of rotational movement indicated by angle 134. In this embodiment arrow 120 is shown in the opposite direction of arrow 130, but in other embodiments the arrows can be in the same direction, and in other embodiments the arrows can be in the opposite direction as shown in FIG. 15. To rotate first 30A and/or second 30B clamping apparatuses, one or both of their first couplers 47,48 can be partially loosened/extended with the user manually rotating the selected clamping apparatus to a selected angular orientation and then the user tightens/retracts the couplers 47,48 to again clamp the clamping apparatus on first 15 and second 16 repair members for achieving a tight fit between the repair member and surface 14 of damaged pipe 11. The user can then weld repair members 15,16.

In various embodiments, while second clamping apparatus 30B can hold first 15 and second 16 repair members, first clamping apparatus 30A can be loosened and rotated at least 5 degrees relative to one repair member or sleeve about a longitudinal axis, tightened, and then repair welding performed on the one repair member or sleeve 15,16. In various embodiments, while second clamping apparatus 30B can hold one repair member or sleeve 15,16 in place, the first clamping apparatus 30A can be loosened and rotated at least 1, 2, 3, 4, 5, 10, 15, 20, 25, 30, 35, 40, 45, 50, 55, 60, 75, 90, 105, 120, 150, 180, 210, 240, 270, 300, and/or 360 degrees relative to one repair member or sleeve 15,16 about a longitudinal axis of pipe 11, tightened, and then repair welding performed on the one repair member or sleeve 15,16. In various embodiments, while second clamping apparatus 30B can hold one repair member or sleeve 15,16 in place, the first clamping apparatus 30A can be loosened and rotated between a range falling within any two of the above referenced angular measurements about a longitudinal axis relative to one repair member or sleeve 15,16, tightened, and then repair welding performed on the one repair member or sleeve 15,16. In various embodiments, while a second clamping apparatus 30B can hold one repair member or sleeve 15,16 in place, the first clamping apparatus 30A can be loosened and rotated between a range falling within any range between 1 and 360 degrees relative to one repair member or sleeve 15,16 about a longitudinal axis of pipe 11, tightened, and then repair welding performed on the one repair member or sleeve 15,16.

Alternatively, in various embodiments, while first clamping apparatus 30A can hold first 15 and second 16 repair members, second clamping apparatus 30B can be loosened and rotated at least 5 degrees relative to one repair member or sleeve about a longitudinal axis, tightened, and then repair welding performed on the one repair member or sleeve 15,16. In various embodiments, while first clamping apparatus 30A can hold one repair member or sleeve 15,16 in place, the second clamping apparatus 30B can be loosened and rotated at least 1, 2, 3, 4, 5, 10, 15, 20, 25, 30, 35, 40, 45, 50, 55, 60, 75, 90, 105, 120, 150, 180, 210, 240, 270, 300, and/or 360 degrees relative to one repair member or sleeve 15,16 about a longitudinal axis of pipe 11, tightened, and then repair welding performed on the one repair member or sleeve 15,16. In various embodiments, while first clamping apparatus 30A can hold one repair member or sleeve 15,16 in place, the second clamping apparatus 30B can be loosened and rotated between a range falling within any two of the above referenced angular measurements about a longitudinal axis relative to one repair member or sleeve 15,16, tightened, and then repair welding performed on the one repair member or sleeve 15,16. In various embodiments, while first clamping apparatus 30A can hold one repair member or sleeve 15,16 in place, the second clamping apparatus 30B can be loosened and rotated between a range falling within any range between 1 and 360 degrees relative to one repair member or sleeve 15,16 about a longitudinal axis of pipe 11, tightened, and then repair welding performed on the one repair member or sleeve 15,16.

In various embodiments the relative rotation/welding described above regarding first 30A and/or second 30B clamping apparatuses can be done multiple times to achieve a good welding of first and second repair members 15,16.

FIG. 16 is a perspective view of the first 30A and second 30B clamping apparatuses and schematically indicating that particular couplers 47 and/or 48 (of either first 30A and/or second 30B clamping apparatuses) can be expanded to allow the relative rotational and/or translational movement and then retracted to again clamp onto the first 15 and second 16 repair members to then allow welding of the first 15 and/or second 16 repair members. Arrow 110 in FIG. 15 schematically indicates that first clamping apparatus 30A is translated closer to second clamping apparatus 30B (the distance moving from 230 in FIGS. 15 to 234 in FIG. 16).

To translate first 30A and/or second 30B clamping apparatuses, one or both of their first couplers 47,48 can be partially loosened/extended with the user manually rotating the selected clamping apparatus to a selected linear translation and then the user tightens/retracts the couplers 47,48 to again clamp the clamping apparatus on first 15 and second 16 repair members for achieving a tight fit between the repair member and surface 14 of damaged pipe 11. The user can then weld repair members 15,16.

In various embodiments, while second clamping apparatus 30B can hold first 15 and second 16 repair members, first clamping apparatus 30A can be loosened and translated an extent so as to change the relative distance between the first 30A and second 30B clamps by at least 5 percent of the original distance 230 (e.g., changing from 230 to 234 by at least 5 percent), tightened, and then repair welding performed on the one repair member or sleeve 15,16. In various embodiments, while second clamping apparatus 30B can hold one repair member or sleeve 15,16 in place, first clamping apparatus 30A can be loosened and slid relative to the one repair member or sleeve 15,16 so as to change the relative distance between the first and second clamps by at least 1, 2, 3, 4, 5, 10, 15, 20, 25, 30, 35, 40, 45, 50, 55, 60, 65, and/or 75 percent (e.g., changing from 230 to 234 by at least the specified percentage), tightened on the one repair member or sleeve 15,16, and then repair welding performed on the one repair member or sleeve 15,16. In various embodiments, while second clamping apparatus 30B can hold one repair member or sleeve 15,16 in place, first clamping apparatus 30A can be loosened and slid relative to the one repair member or sleeve 15,16 so as to change the relative distance between the first 30A and second 30B clamps by an amount falling within any two of the above referenced percentage changes in distance, tightened on the one repair member or sleeve 15,16, and then repair welding performed on the one repair member or sleeve 15,16.

Alternatively, in various embodiments, while first clamping apparatus 30A can hold first 15 and second 16 repair members, second clamping apparatus 30B can be loosened and translated an extent so as to change the relative distance between the first 30A and second 30B clamps by at least 5 percent of the original distance 230 (e.g., changing from 230 to 234 by at least 5 percent), tightened, and then repair welding performed on the one repair member or sleeve 15,16. In various embodiments, while first clamping apparatus 30A can hold one repair member or sleeve 15,16 in place, second clamping apparatus 30B can be loosened and slid relative to the one repair member or sleeve 15,16 so as to change the relative distance between the first and second clamps 30A,30B by at least 1, 2, 3, 4, 5, 10, 15, 20, 25, 30, 35, 40, 45, 50, 55, 60, 65, and/or 75 percent (e.g., changing from 230 to 234 by at least the specified percentage), tightened on the one repair member or sleeve 15,16, and then repair welding performed on the one repair member or sleeve 15,16. In various embodiments, while first clamping apparatus 30A can hold one repair member or sleeve 15,16 in place, second clamping apparatus 30B can be loosened and slid relative to the one repair member or sleeve 15,16 so as to change the relative distance between the first 30A and second 30B clamps by an amount falling within any two of the above referenced percentage changes in distance, tightened on the one repair member or sleeve 15,16, and then repair welding performed on the one repair member or sleeve 15,16. In various embodiments the relative change in distance can be either shortened or lengthened.

In various embodiments the relative translation/welding described above regarding first 30A and/or second 30B clamping apparatuses can be done multiple times to achieve a good welding of first and second repair members 15,16.

In various embodiments the relative rotation and/or translation can occur in either the first 30A and/or second 30B clamping apparatuses.

Figure 17:
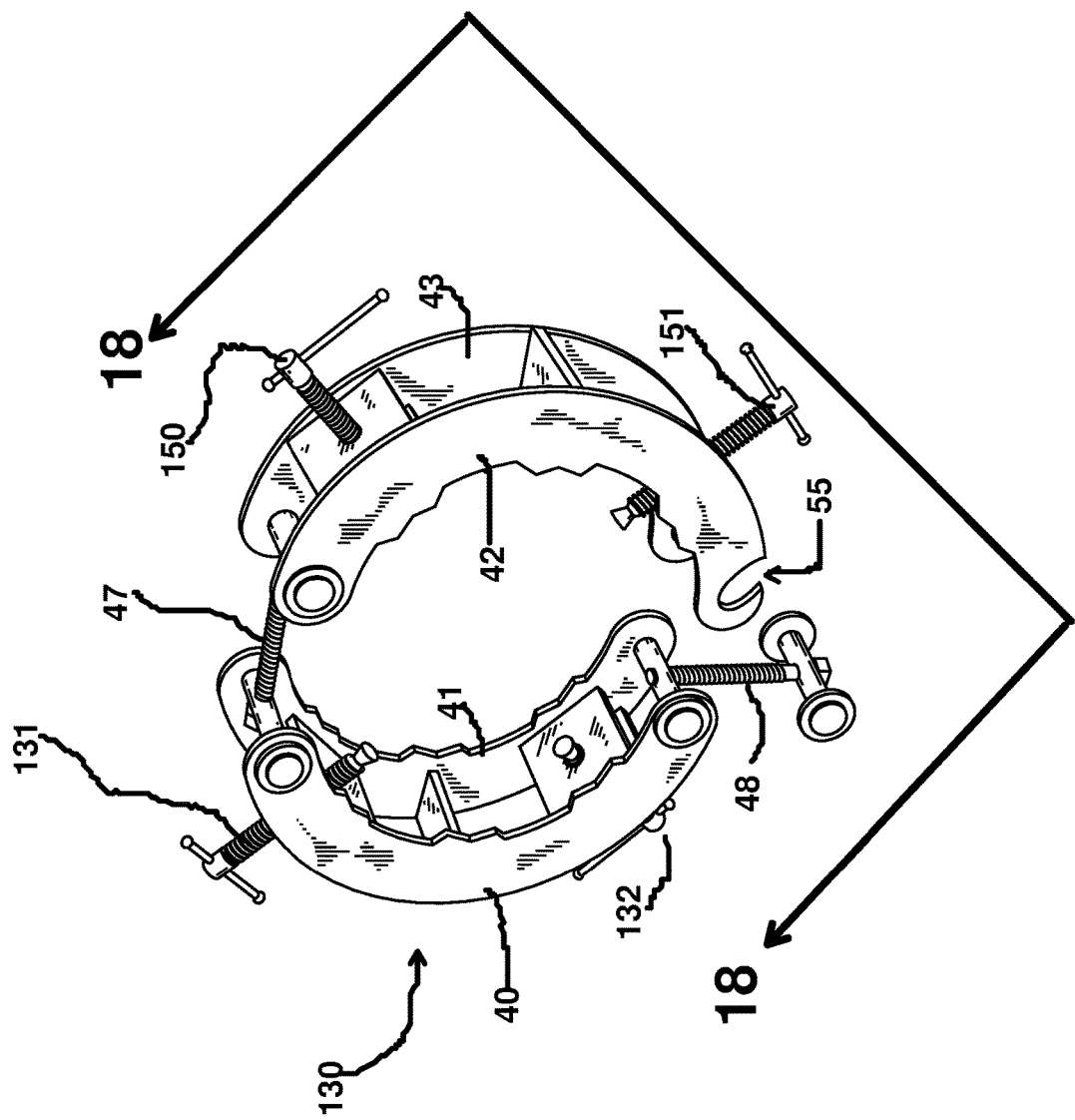
FIG. 17 is a perspective view of an alternative clamping apparatus which includes a plurality of manually operated jacks symmetrically spaced about the clamping apparatus, which manually operated jacks can be independently extended and/or retracted relative to each other to apply pushing force at selected locations on the first and/or second repair members.
Figure 18:
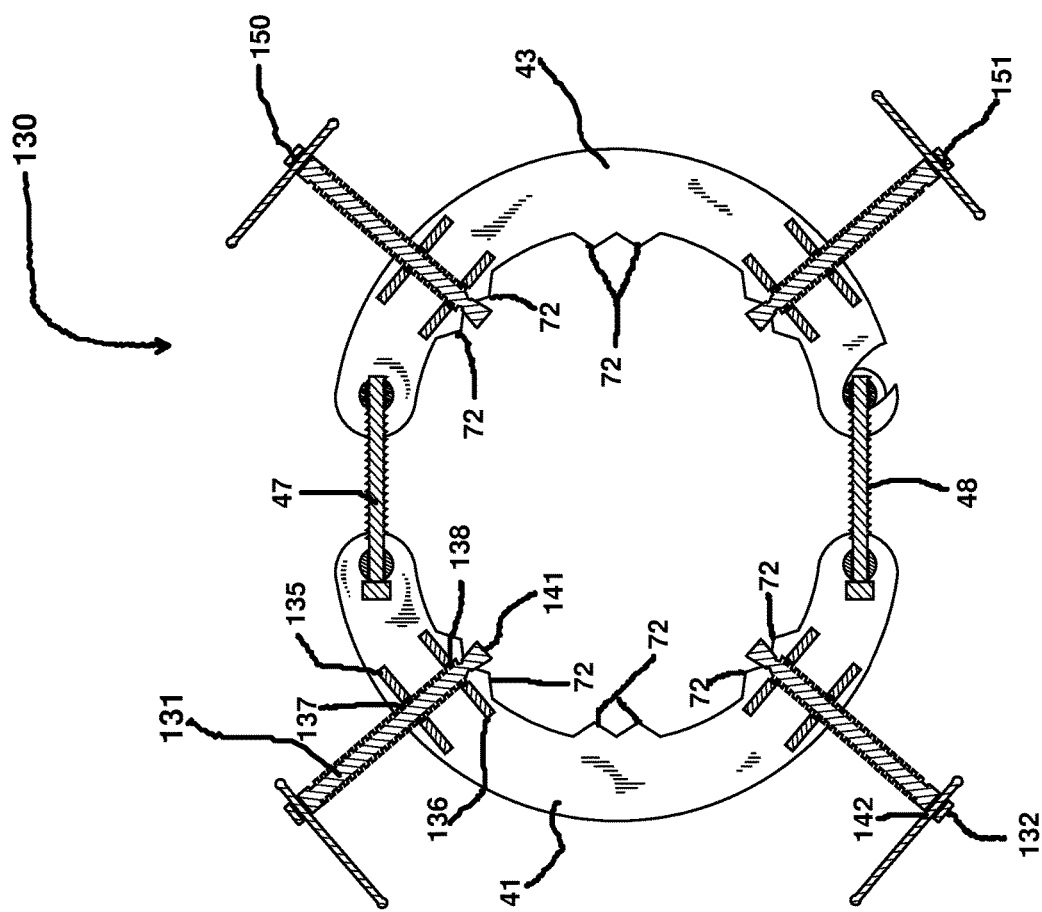
FIG. 18 is a sectional view of the alternative clamping apparatus of FIG. 17 taken along the lines 18-18 of FIG. 17.
Figure 19:
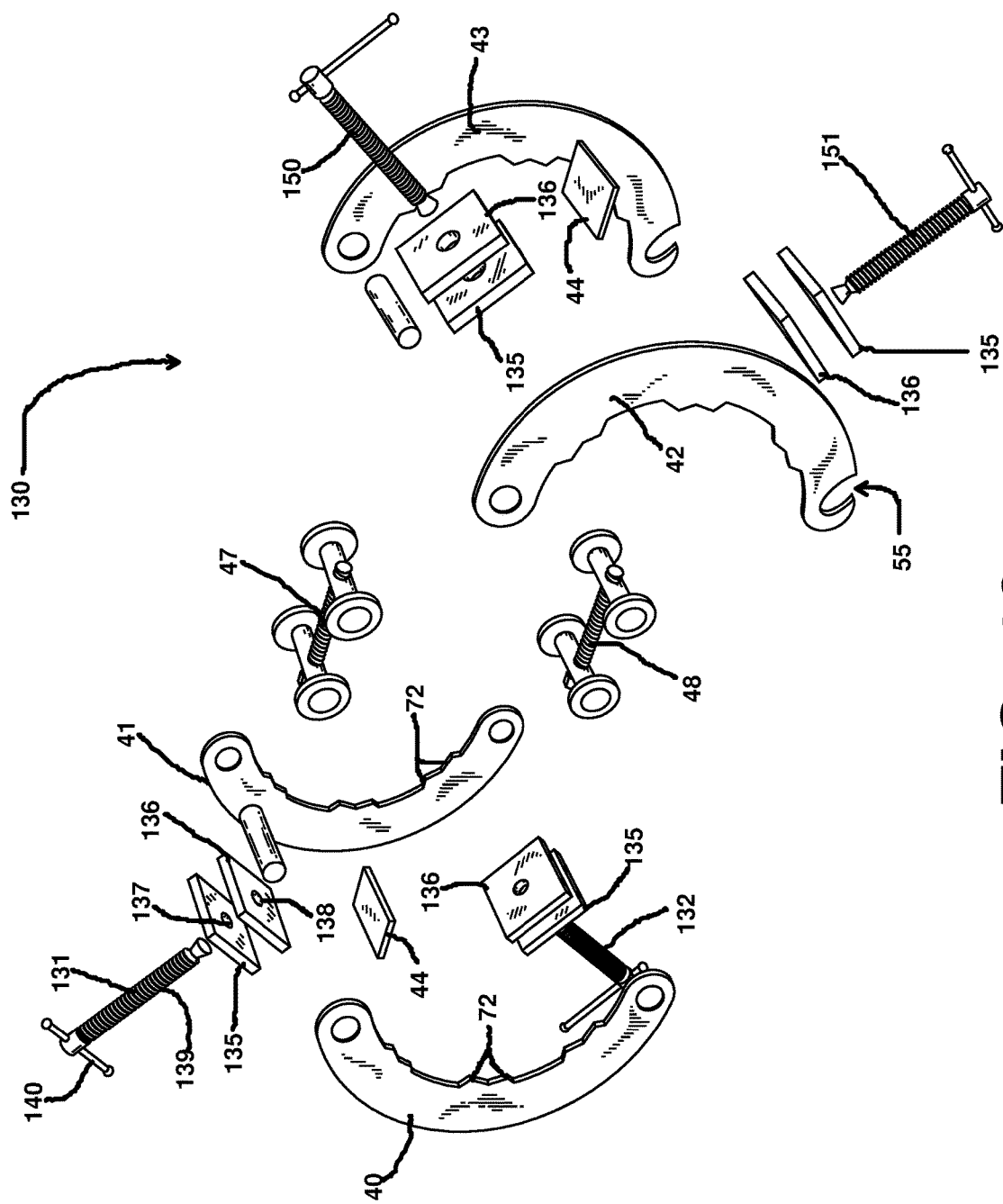
FIG. 19 is an exploded view of the alternative clamping apparatus of FIG. 17.

FIGS. 17-19 show an additional embodiment wherein clamp 130 can be used to replace either or both clamps 30A or 30B of FIGS. 9-16. Clamp 130 includes arc shaped or curved members or plates 40, 41, 42, 43 and can employ gussets/plates/spacers 44, 45 as with the clamps 30A, 30B. Clamp 130 provides a plurality (e.g., four) of jacks 131, 132, 150, 151.

Each jack 131, 132, 150, 151 is mounted to arc shaped members 40, 41 or 42, 43 with plates 135, 136. Each plate 135, 136 has an internally threaded opening. Plate 135 has internally threaded opening 137. Plate 136 has internally threaded opening 138. Each jack 131, 132, 150, 151 has an externally threaded shaft 139. Externally threaded shaft 139 has handle 140 at one end (outer) portion and anvil 141 at the other (inner) end portion. Each threaded shaft 139 forms a threaded connection with plates 135, 136 at internally threaded openings 137, 138. A user is able to apply pressure to repair members 15, 16 in FIGS. 9-16 by tightening one or more of the jacks 131, 132, 150, 151. Shaft 139 is rotated with handle 140 thus pushing anvil 141 into contact with repair members 15, 16. Jacks 131, 132, 150, 151 push the repair members 15, 16 against pipe section 11 as part of the method of FIGS. 9-16.

Figure 20:
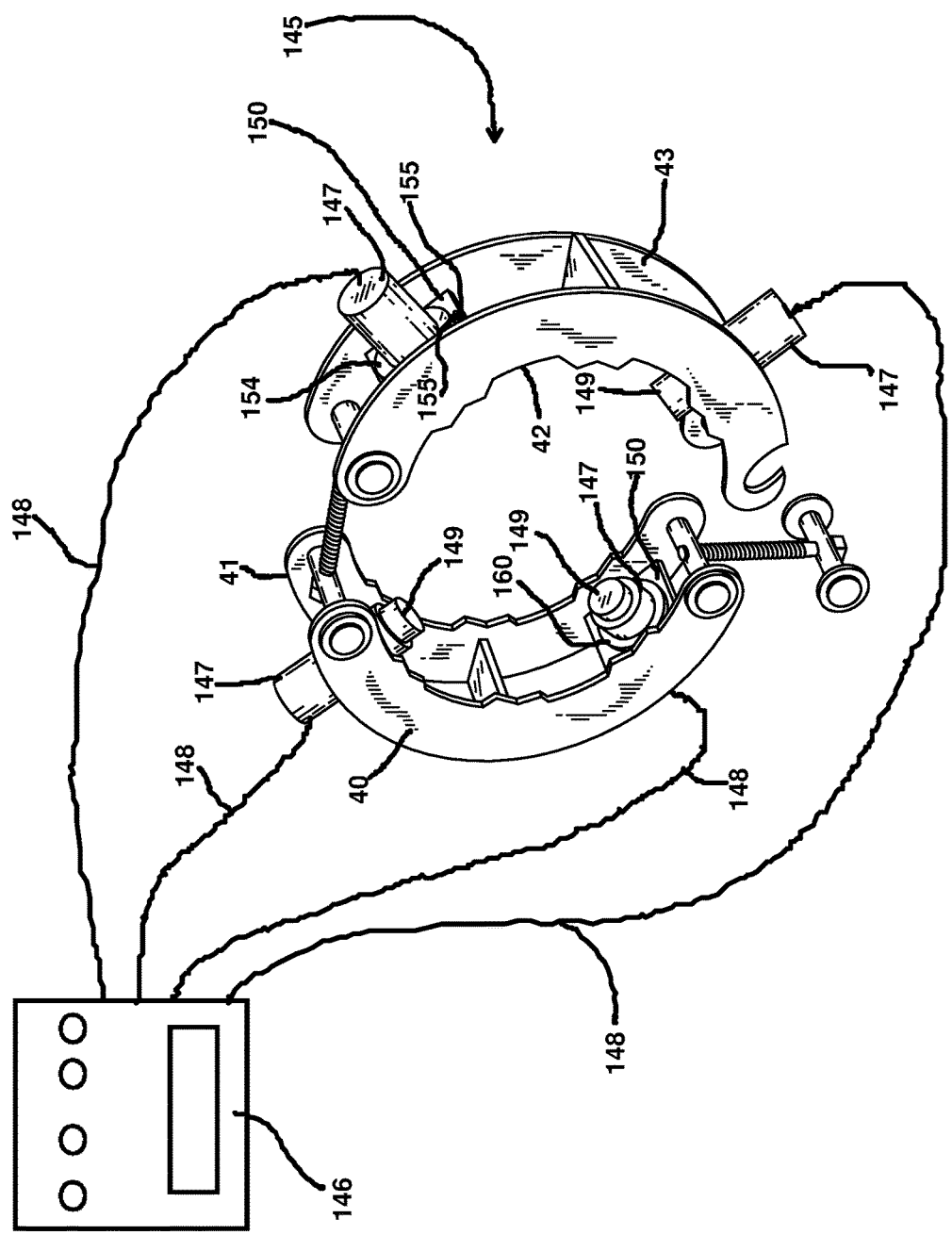
FIG. 20 is a perspective view of another alternative clamping apparatus which includes a plurality of hydraulically operated jacks symmetrically spaced about the clamping apparatus, which hydraulically operated jacks can be connected to a hydraulic power source and controller and independently extended and/or retracted relative to each other to apply pushing force at selected locations on the first and/or second repair members.
Figure 21:
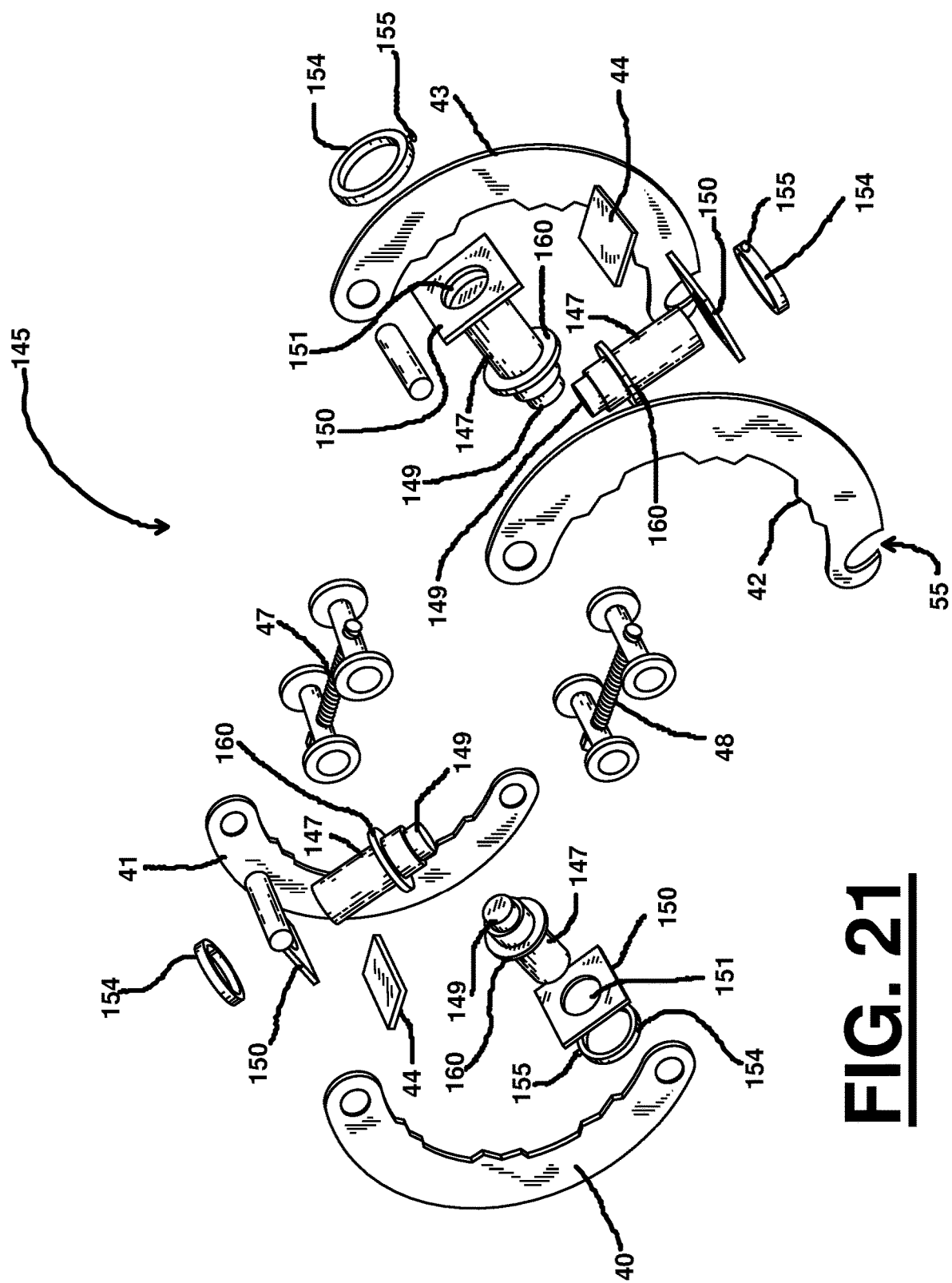
FIG. 21 is an exploded view of the alternative clamping apparatus of FIG. 20.

FIGS. 20-21 show yet another embodiment of a clamp designated as 145 for use with the method and apparatus of FIGS. 9-16. Clamp 145 can optionally replace clamps 30A and/or 30B as part of the method shown in FIGS. 9-16. In FIGS. 20-21, clamp 145 uses a controller 146 to supply hydraulic fluid via hydraulic lines 148 to each of a plurality of hydraulic cylinders or jacks 147. Each hydraulic cylinder 147 has a pushrod 149 that can be extended or retracted relative to plates 40, 41 or 42, 43. Each cylinder or jack 147 can be mounted to a plate 152 at plate opening 153. Flanges 154 are provided to perfect a connection of each cylinder 147 to a plate 152 via opposed collar 154 and locking set screw 155. Plates 152 can be welded to a repair of the arc shaped members 40, 41 or 42, 43. Each cylinder 147 can be slid into opening 153 of plate 152 until flange 160 contacts plate 150 on the interior side of flange 150, and then flange 154 slid onto cylinder 147 on the opposite side of cylinder 147 (compared to flange 160) with flange 154 being slid over cylinder 147 until it contacts plate 152. Set screw 155 can be tightened and then cylinder 147 will be held in place by both flanges 154 and 160.

Once clamp 145 is attached to pipe section 11, jacks or cylinders 147 can be so placed on plates 40, 41, 42, 43 that the pushrods 149 are located symmetrically around pipe section 11 (e.g., 90 degrees apart). Controller 146 enables each pushrod 149 to be extended or retracted independently of the other pushrods 149. In this fashion, a pushing force can be applied with a selected pushrod 149 to a selected locale on the first or second repair member 15, 16.

The following is a list of reference numerals:

| LISTING OF REFERENCE NUMERALS: | |
| --- | --- |
| REFERENCE NUMBER | DESCRIPTION |
| 10 | pipe repair apparatus |
| 11 | pipe section |
| 12 | damaged portion/crack/hole/corroded portion |
| 13 | pipe trench |
| 14 | outer surface |
| 15 | first repair member |
| 16 | second repair member |
| 17 | convex surface |
| 18 | concave surface |
| 19 | curved edge |
| 20 | curved edge |
| 21 | arrow |
| 22 | convex surface |
| 23 | concave surface |
| 24 | curved edge |
| 25 | curved edge |
| 26 | arrow |
| 27 | rigging/sling/cable |
| 28 | rigging/sling/cable |
| 29 | arrow |
| 30A | first clamp apparatus |
| 30B | second clamp apparatus |
| 31 | lifting harness/lift cable |
| 32 | cable section |
| 33 | cable section |
| 34 | arrow |
| 35 | straight edge |
| 36 | straight edge |
| 37 | straight edge |
| 38 | straight edge |
| 39A | clamp section/jaw/arm |
| 39B | clamp section/jaw/arm |

-continued

LISTING OF REFERENCE NUMERALS:

| REFERENCE NUMBER | DESCRIPTION |
| --- | --- |
| 40 | arc shaped member/curved member/plate |
| 41 | arc shaped member/curved member/plate |
| 42 | arc shaped member/curved member/plate |
| 43 | arc shaped member/curved member/plate |
| 44 | gusset/plate/spacer |
| 45 | gusset/plate/spacer |
| 46 | opening |
| 47 | first coupler |
| 48 | second coupler |
| 49 | pivotal connection |
| 50 | pivotal connection |
| 51 | pivotal connection |
| 52 | pivotal connection |
| 53 | pivotal connection |
| 54 | pivotal connection |
| 55 | slot/recess/opening |
| 56 | bolt shaft |
| 57 | head |
| 58 | nut/pivot point/pivot |
| 59 | opening |
| 60 | external threads |
| 61 | nut/pivot point/pivot |
| 62 | opening |
| 63 | end plate/retainer |
| 64 | end plate/retainer |
| 65 | end plate/retainer |
| 66 | end plate/retainer |
| 67 | unthreaded portion |
| 68 | arrow |
| 69 | arrow |
| 70 | arrow |
| 71 | arrow |
| 72 | contact point/projection |
| 100 | arrow |
| 102 | arrow |
| 106 | angle |
| 110 | arrow |
| 120 | angle |
| 124 | angle |
| 130 | clamp |
| 131 | jack |
| 132 | jack |
| 134 | angle |
| 135 | plate |
| 136 | plate |
| 137 | internally threaded opening |
| 138 | internally threaded opening |
| 139 | threaded shaft |
| 140 | handle |
| 141 | anvil |
| 145 | clamp |
| 146 | controller |
| 147 | hydraulic cylinder/jack |
| 148 | hydraulic line |
| 149 | pushrod |
| 150 | jack |
| 151 | jack |
| 152 | plate |
| 153 | plate opening |
| 154 | flange/annular flange |
| 155 | threaded fastener/set screw |
| 160 | flange |
| 200 | perimeter edge |
| 202 | perimeter edge |
| 210 | perimeter edge |
| 212 | perimeter edge |
| 230 | distance |
| 234 | distance |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of repairing a pipe section that is damaged comprising the steps of:
    a) providing one or more repair members, each having an inner curved surface that conforms generally to at least part of the outer surface of the pipe section;
    b) providing one or more clamps, each including first and second pairs of curved members and two couplers that each connect to both pairs of curved members, said couplers being positioned at spaced apart positions, wherein each clamp section is comprised of a pair of curved plates connected with a plurality of transverse plates;
    c) wherein each coupler includes an externally threaded member and first and second internally threaded nuts, at least one said nut forming a threaded connection with the externally threaded member;
    d) tightening the clamp or clamps to compress the repair member against the pipe section; and
    e) wherein in step "d" one or both of the externally threaded members is rotated to change the distance between the nuts.

2. The method of claim 1 wherein step "d" is performed at a first position, and further comprising repeating steps "b" through "e" at a second position that is spaced from said first position.

3. The method of repairing a pipe section of claim 1, wherein the curved members of each pair have spaced part ends, at least one said end having a slot and step "b" includes attaching a said nut to two of said curved members at said slots.

4. The method of repairing a pipe section of claim 3, wherein one or more of the nuts are both pivotally attached to the curved members and removably attachable to the curved members at a said slot.

5. The method of repairing a pipe section of claim 1, further comprising the step of spacing the curved members apart with one or more transverse plates.

6. The method of repairing a pipe section of claim 1, wherein in step "b" wherein the clamps have concave surfaces with one or more projections.

7. The method of claim 1, wherein step "d" includes tightening one or more jacks mounted on said clamps.

8. The method of claim 1, wherein in step "b" one of said curved plates has a slot that connects with a said nut to form a pivotal connection.

9. A method of repairing a pipe section that is damaged comprising the steps of:
    a) providing one or more repair members, each having an inner curved surface that conforms generally to the outer surface of the pipe section;
    b) providing one or more clamps, each including first and second pairs of arc shaped members and two couplers that each connect to both pairs of arc shaped members, said couplers being positioned at spaced apart positions, wherein each clamp section has a concavely shaped inner surface having one or more convex projections;
    c) wherein each coupler includes an externally threaded member and nuts that each form a connection with said externally threaded member, one said nut forming a threaded connection said externally threaded member;
    d) tightening the clamp or clamps to compress the repair member against the pipe section;

e) wherein in step "d" one or both of the externally threaded members is rotated, which changes the distance between two of the said nuts;

f) repeating step "d" at a second position that is spaced from said first position.

10. The method of repairing a pipe section of claim 9, wherein the curved members of each pair are spaced apart and generally parallel.

11. The method of repairing a pipe section of claim 10, further comprising the step of spacing the arc shaped members apart with one or more transverse plates.

12. The method of repairing a pipe section of claim 9, wherein the arc shaped members of each pair have spaced apart ends, at least one said end having a slot and step "b" includes attaching a said nut to a said curved member at a said slot.

13. The method of repairing a pipe section of claim 12, wherein each of the couplers is pivotally attached to a pair of the arc shaped members and removably attachable to a second pair of the arc shaped members at said slots.

14. A method of repairing a pipe section that is damaged comprising the steps of:

a) providing one or more repair members, each having an inner curved surface that conforms generally to at least part of the outer surface of the pipe section;

b) providing one or more clamps, each including first and second pairs of curved members and two couplers that each connect to both pairs of curved members, said couplers being positioned at spaced apart positions, further comprising one or more jacks mounted on at least one clamp and positioned to direct pressure against one or both of the repair sections:

c) wherein each coupler includes an externally threaded member and first and second internally threaded nuts, at least one said nut forming a threaded connection with the externally threaded member;

d) tightening the clamp or clamps to compress the repair member against the pipe section; and e) wherein in step "d" one or both of the externally threaded members is rotated to change the distance between the nuts.

* * * * *